United States Patent [19]

Ali-Vehmas

[11] Patent Number: 5,444,745
[45] Date of Patent: Aug. 22, 1995

[54] DIVERSITY RECEPTION ARRANGEMENT

[75] Inventor: Timo Ali-Vehmas, Salo, Finland

[73] Assignee: Nokia Mobile Phones Ltd., Salo, Finland

[21] Appl. No.: 14,351

[22] Filed: Feb. 5, 1993

[30] Foreign Application Priority Data

Feb. 14, 1992 [FI] Finland .................... 920650

[51] Int. Cl.[6] ............................ H04L 1/02
[52] U.S. Cl. ............................ 375/347; 455/133
[58] Field of Search ............ 375/3, 7, 40, 100, 4, 375/59, 75, 211, 219, 267, 347, 214, 295, 316; 455/33.1, 134, 132, 15, 33.3, 133, 274, 273, 127, 89; 379/59, 60, 63, 58, 99, 444, 338, 351, 206; 370/95.3

[56] References Cited

U.S. PATENT DOCUMENTS

| | | | |
|---|---|---|---|
| 4,513,412 | 4/1985 | Cox | 370/29 |
| 4,837,800 | 6/1989 | Freeburg et al. | 455/33.3 |
| 5,065,449 | 11/1991 | Gordon et al. | 455/15 |
| 5,297,191 | 3/1994 | Gerszberg | 379/58 |
| 5,303,395 | 4/1994 | Dayani | 455/127 |

FOREIGN PATENT DOCUMENTS

| | | | |
|---|---|---|---|
| 0118357 | 9/1984 | European Pat. Off. | H04B 7/10 |
| 0440239A2 | 8/1991 | European Pat. Off. | |
| 0452289A1 | 10/1991 | European Pat. Off. | |
| 93300909 | 6/1993 | European Pat. Off. | |
| 920650 | 8/1992 | Finland | |

Primary Examiner—Stephen Chin
Assistant Examiner—Tesfaldet Bocure
Attorney, Agent, or Firm—Perman & Green

[57] ABSTRACT

In the booster (20) of a cellular radio telephone (20) the diversity reception is arranged so that the quality, e.g. the level, of the received and amplified (Rx1, Rx2) signal is detected (A1, A2), the better signal is selected by a logic (DP), and the selected better signal is connected (SWb) to the connection (C1) of the cellular radio telephone's antenna cable (AC). The arrangement includes a circuit (TF, DP) for receiving timing information from the cellular radio telephone in order to synchronize the operation of the cellular radio telephone and the booster.

5 Claims, 1 Drawing Sheet

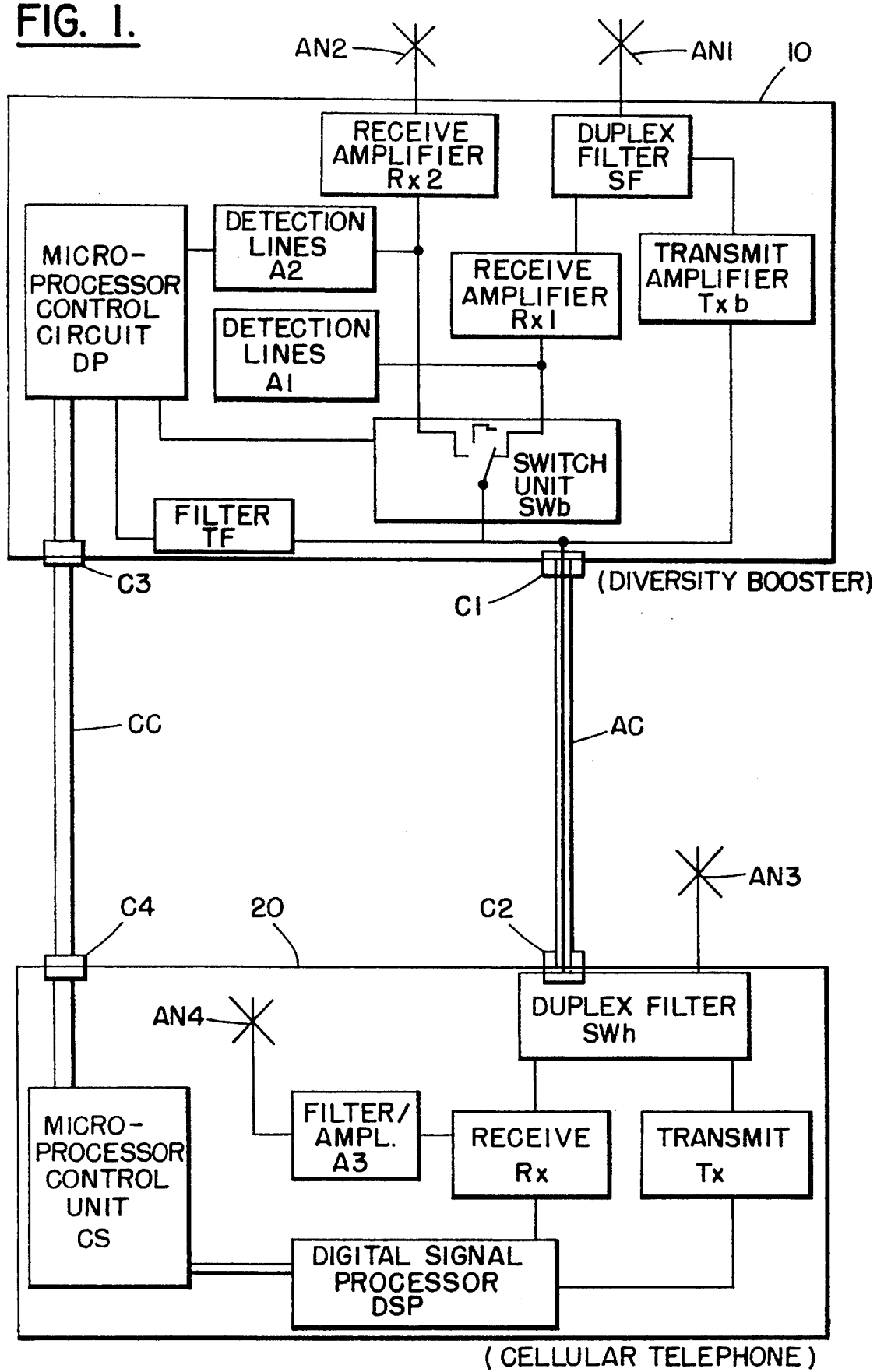

DIVERSITY RECEPTION ARRANGEMENT

This invention relates to a diversity arrangement particularly but not exclusively for use in a cellular radio telephone booster.

BACKGROUND OF THE INVENTION

The antenna emitting power of a cellular radio telephone such as a mobile telephone can be increased in a known way by arranging a radio frequency power amplifier, a so called booster or booster amplifier, between the cellular radio telephone and the antenna. In practice it is also necessary to arrange for amplification of the signal received in the booster. Due to cost constraints the booster construction is kept as simple as possible, so that it comprises only the necessary power amplifiers.

It is also possible to compensate for the position sensitivity in a weak field by arranging a diversity reception in a known way, e.g. using two antennas. When the signal received by one antenna "fades", the stronger signal received by the other antenna can be connected to the receiver.

When it is desired to combine diversity reception with the booster solution, one straightforward solution is to duplicate the amplifier circuits, i.e. to arrange amplifiers for both receive antennas. (On the transmit side still only one power amplifier and one of the antennas is used to transmit the radio signal.) Then the selection of the better signal is made in the cellular telephone as opposed to the booster. The cellular radio telephone is provided with sufficiently versatile and intelligent circuits to perform the task.

Then we have the problem of a duplicated connection between the telephone and the booster.

An alternative diversity booster would comprise complete transmit/receive circuits in the booster, but because of its cost this solution is not feasible.

It is known e.g. from U.S. Pat. No. 4,513,412 to provide a selection of antenna at a portable or at a base station, whereby both stations will send a preamble over both antennas, that is two preambles will follow each other in successive time slots. The qualities of the preambles will determine which antenna is selected.

However, with this known arrangement, and in digital cellular radio telephone systems generally, problems are caused by the synchronization or timing required by the receive and transmit functions, because the signals are sent as short bursts, which have to be identified also during reception.

Signals are generally transmitted between base stations and mobile stations in cellular radio telephone systems using so-called multiple-access systems. One such system is known as Frequency-division Multiple Access (FDMA) in which the available radio frequency bandwidth is divided into channels of a predetermined bandwidth and the individual channels are assigned on demand, on a first-come first-served basis. As each call is made a channel is provided for the entire duration of the call and information may be transmitted continuously. In an alternative system known as Time-division Multiple Access (TDMA) the frequency channels are further divided into a predetermined number of sequential time slots only one of which is provided for an individual user. Therefore, information must be transmitted in sequential bursts at pre-determined time intervals arranged to coincide with the user's time slots. TDMA provides the advantage of additional capacity but requires additional electronics within the base station and mobile stations to enable temporal control of the transmission of information.

SUMMARY OF THE INVENTION

According to the invention there is provided a diversity reception arrangement for a cellular radio telephone booster having two antennas wherein the arrangement comprises means for determining the quality of individual signals received by each antenna, means for selecting the better of the received signals, and means for transmitting the selected signal to a cellular radio telephone through an antenna cable, characterized in that the arrangement comprises means for receiving signal frame timing information supplied from the cellular radio telephone in order to synchronize the operation of the cellular radio telephone and the booster.

An advantage of the invention is to provide a diversity reception arrangement, which obviates the need for duplication of circuitry.

An arrangement in accordance with the invention is used in a digital system, where the signals are transmitted as bursts of digital data. Then the synchronization information about the signal frame coming from the mobile telephone to the booster is advantageously obtained by filtering the signal from the antenna cable.

The selection of the better antenna signal, which is connected to the mobile telephone, could be advantageously based on the quality of the received signal, e.g. on the signal level, which can be obtained by continuous detection, or by a detection at the beginning of the digital signal bursts.

BRIEF DESCRIPTION OF THE DRAWING

The invention is described below, by way of example, with reference to the accompanying drawing, which is a schematic illustration of digital cellular radio telephone operation in a TDMA-environment in accordance with the invention.

DETAILED DESCRIPTION OF THE INVENTION

A cellular radio telephone can be used as an independent unit, and its construction is known as such. Here it is described only for understanding the description of the invention. Its operation is controlled by a control unit CS, usually a microprocessor, which is linked with programs and circuits (not shown) required for the control of the mobile telephone and the user interface. The processor controls a digital signal processing unit DSP, which in a way known as such processes transmitted and received signals, performing the required analog-to-digital conversion and digital-to-analog conversion of voice signals and radio frequency signals. The DSP-unit is connected to the transmit branch Tx and the receive branch Rx, which contain the necessary filtering and amplifying circuits, and which on the other hand are connected to the mobile telephone's external antenna An3 through a duplex filter SWh. If required, the duplex filter may also have a change-over switch, with which the antenna An3 can be switched off when an antenna cable AC of a separate antenna is connected to the connector C2.

The FIGURE also shows a possibility, with which diversity reception can be realized in a hand-held telephone. Then the internal antenna An4 is connected via the filtering/amplification A3 to the receiver line Rx.

In this case the control unit CS controls the booster operation via the system bus. The bus cable CC is connected to the hand-held telephone through the connector C4. Via this bus the unit CS supplies to the booster 10 the instructions required at start-up, and, when required, other control information in a known way. The bus could be e.g. an M-BUS developed by the company Nokia Mobile Phones. Connection of the system bus to the booster is a solution, which simplifies the use, but it is not necessary because the required booster control functions could be replaced by operating buttons arranged in the booster.

According to the FIGURE, two antennas An1 and An2 are connected to the diversity booster 10 via antenna cables (not shown). The antenna An1 is connected via the duplex filter SF to the transmit amplifier Txb and the receive amplifier Rx1, in the same way as in the hand-held telephone 20. The antenna An2 is connected directly to the receive amplifier Rx2 via a required filtering. The antenna signals amplified by the receive amplifiers Rx1 and Rx2 are connected to a switch unit SWb, which controlled by the control circuit DP connects one of the amplified signals to the connection C1 of the antenna cable AC, as is shown in the figure. The antenna connection can be connected to ground through the switch SWb, if required. The transmit signal supplied to the transmit amplifier Tx is also obtained from the connection C1.

The booster operation, or the functions of the transmit and receive amplifiers and the other booster circuits, is controlled by a control unit DP, which can comprise a suitable microprocessor with memory and programs or any other suitable logic arrangement. The unit DP obtains the required basic information from the hand-held telephone's control unit CS through the system bus cable CC connected to the booster bus connection C3. To the control unit DP are also connected two detection lines A1 and A2, which detect the quality of the receive signals amplified in the amplifiers Rx1 and Rx2. A person skilled in the art will understand that the line A1 can comprise a mixer or mixers, filtering of their mixing results, and a required amplifier, to which a local oscillator circuit is connected in a phase locked loop to detect the intermediate and/or the baseband signal of the received signal. The detection line A2 has a corresponding structure.

A signal transmitted from the hand-held telephone via the antenna cable AC and representing the synchronization or timing information of the TDMA-frame is also connected via the filter TF as an input to the control unit DP.

The booster unit also contains a local power supply, a mounting rack and connectors required by the antenna cables, which for simplicity are not shown in more detail.

In accordance with the invention the diversity booster 10 operates as follows. A transmit signal generated in the hand-held telephone 20 is supplied by the antenna cable AC to the booster, where the amplifier Txb amplifies the transmit signal to the highest transmit level allowed by the cellular system (or to any other selected suitable level). A linear amplifier with local power level control acts as the amplifier Txb. The power level is set in the hand-held telephone by transmitting the transmit signal at a selected level (e.g. 0.3 W), whereby the hand-held telephone's control unit CS by instructions provided via the system bus CC can control the booster power regulation with the unit DP.

In a TDMA-system the digital signals are transmitted as bursts, whose position in time is determined according to the synchronization received from a base station. The control unit CS receives the synchronization and accordingly it transfers the transmit moment timing to the booster 10 via the antenna cable AC as a low-frequency or d.c. signal, which the booster control unit DP receives after the filtering TF. In this way there is provided a mutual synchronization of the hand-held telephone and the booster. Instead of filtering the timing from the transmission bursts, one can employ filtering from the signal a low-frequency signal that has been deliberately added thereto.

In the receive direction the booster unit 10 receives via the antennas An1 and An2 a signal coming from a base station. The reception is continuous, except when the booster transmits a radio frequency signal from the transmitter Txb to the antenna. The received signal is amplified (Rx1, Rx2). The detection lines A1, A2 monitor both received signals. The detection line detects the quality of the actual received signal, in this case for example the level of the useful signal. The control unit DP makes a decision based on the detected quality and selects the signal having a better quality to be supplied to the hand-held telephone. Accordingly the unit DP operates the switch unit SWb into a position, which corresponds to the decision, whereby the selected signal is connected to the antenna cable AC.

An algorithm required for the decision making is stored in the control unit DP, providing an optimal switching of the antenna, for example when the level of the received signal varies. The algorithm can be any algorithm known as such and related to diversity reception. The simplest way is to use the level as the signal quality. Alternatively it is possible to use noise signal minimizing, the quality of a predefined part of the contents of the useful signal, the interference signal of an adjacent channel, etc.

In a TDMA-environment the signals are packed as bursts, as was already mentioned. The length of a burst can be about 6.6 ms (U.S.A., Japan) or about 0.5 ms (Europe). (The TDMA time slots are: receive, transmit, internal functions, which is a repeating sequence having the length of e.g. 3* 6.6 ms, in total about 20 ms.) The quality of the received signal is determined at the beginning of each burst by a short measurement, on the basis of which the reception antenna is selected.

With the diversity booster arrangement according to the invention it is possible to utilize the advantages of the diversity solution, but it is not necessary to arrange a complete receiver in the booster. According to the invention the extensive logic and signal processing already existing in the hand-held telephone is utilized as far as possible.

In view of the foregoing it will be clear to a person skilled in the art that modifications may be incorporated without departing from the scope of the present invention.

I claim:

1. A diversity reception booster for a cellular radio telephone, said booster coupled to two antennas and operating in a time division multiple access signal environment, the booster comprising:

an antenna cable for connection to a cellular radio telephone, said cellular radio telephone applying signal frame timing information to said antenna cable;

control circuit means responsive to said signal frame timing information from the cellular radio telephone received from said antenna cable to synchronize operation of said booster with the cellular radio telephone;

means for determining quality of individual signals received by each of said two antennas;

means for selecting a better of said individual signals in response to an output from said means for determining; and means for transmitting the selected signal to said cellular radio telephone through said antenna cable.

2. The booster according to claim 1, which operates in a digital system in which signals are transmitted as digital data bursts over said antenna cable from said cellular radio telephone.

3. The booster according to claim 1, further comprising:

filter means connected between said antenna cable and said control circuit means for filtering said signal frame timing information from a transmission burst and providing said information to said control circuit means.

4. The booster according to claim 1, further comprising:

filter means connected between said antenna cable and said control circuit means for filtering from a transmission burst, a low frequency component superimposed thereon and containing said signal frame timing information, and providing said information to said control circuit means.

5. The booster according to claim 2, wherein said means for determining quality detects said signal quality at a beginning of each received radio signal burst.

* * * * *